Figure 1:
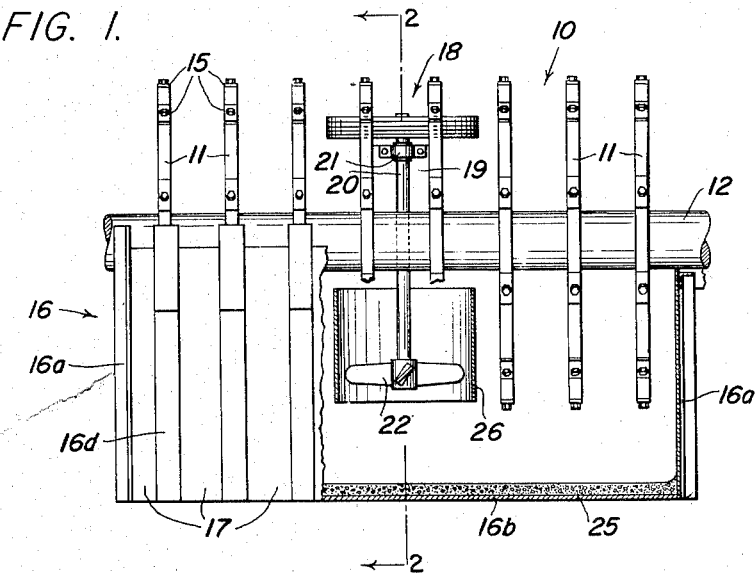

Jan. 18, 1955    W. H. KELSEY    2,699,872
PULP-CIRCULATING VACUUM FILTER
Filed July 10, 1952    2 Sheets-Sheet 1

INVENTOR:
WILLIAM H. KELSEY,
BY
ATTORNEYS.

Jan. 18, 1955  W. H. KELSEY  2,699,872
PULP-CIRCULATING VACUUM FILTER
Filed July 10, 1952  2 Sheets—Sheet 2

INVENTOR:
WILLIAM H. KELSEY,
BY
ATTORNEYS.

United States Patent Office
2,699,872
Patented Jan. 18, 1955

2,699,872

PULP-CIRCULATING VACUUM FILTER

William H. Kelsey, Stockton, Utah

Application July 10, 1952, Serial No. 298,096

5 Claims. (Cl. 210—199)

This invention relates to apparatus for filtering solid particles from liquids, especially in the treatment of chemical and metallurgical pulps or slurries, and has particular reference to vacuum filters.

In the filtering of such pulps or slurries, for the purpose of removing the solids from the liquid in which they are suspended, considerable difficulty has been encountered due to the tendency of the solids to settle and segregate. Ordinarily, coarse and heavy particles of any given pulp settle rapidly, finer particles of less specific gravity settle less rapidly, very light fines settle relatively slowly, ordinary slimes settle very slowly, and frothy slimes tend to float. These different rates of settling of the various solid particles in the pulp are caused by the differences in particle size and specific gravity, and bring about segregation and stratification of the solid constituents of the pulp, a condition known in the art as classification.

If classification of the pulp in a filter tank is permitted during a filtering operation, the filtering elements will be called upon to handle several different concentrations of solid matter over respectively different portions of their filtering surfaces. Thus, heavy and coarse, free-filtering particles will be deposited over certain portions of the filtering surfaces; difficult-to-filter fines will be deposited over other portions of such surfaces; and practically impossible-to-filter slimes will be deposited over still other portions of the surfaces. As a consequence, a thick cake will build up over only those portions of the filtering surfaces disposed in the zone of the first-mentioned free-filtering particles. A thin cake will build up for a time over those portions of the filtering surfaces disposed in the zone of the difficult-to-filter fines, followed by blinding of those areas and consequent destruction of the filtering function thereof. Those portions of the filtering surfaces disposed in the zone of the slimes will blind almost immediately. Obviously, such conditions make for inefficient filtering, since the filter cake represents the end product of a filtering operation in most instances.

It has long been realized by those most familiar with filter practice, that, to have efficient filtering, there must not be classification of the solid constituents of the filter pulp. The particles of different sizes should be uniformly distributed in the pulp, so that the relatively coarse particles will build up a filter cake over substantially the entire superficial area of each filter element. Such filter cake will then function as a filter medium for finer particles, and, as the pores decrease in size, as a filter medium for the slimes. Such an operating condition will not only stop most of the fines and slimes from getting into the interstices of the filter medium, thus blinding it, but will promote the building of a thick and uniformly constituted cake evenly over the entire superficial surface of each filter element.

Thus, a condition to be desired in filter practice is a bridging of the interstices of the filter medium by relatively coarse particles; a bridging of such coarse particles by particles of medium size; a bridging of the medium sized particles by relatively fine particles; and the catching of the slimes by the resulting filter cake of graduated porosity. In this way, thick filter cakes may be built up, which retain filtering effectiveness over relatively long periods of operation.

Many and various efforts have been made to eliminate or effectively inhibit classification of solids in filter tanks. So far, however, none of these have proven really practical, in the sense that results approaching the recognized ideal have been achieved. Instead, not only has there been a failure to effectively mix all the pulp in the filter tank, so that all sizes of particles are substantially uniformly distributed throughout the tank and so that the entire filtering surface area is contacted by substantially identical mixtures of particle sizes and specific gravities, but various mechanical difficulties have been introduced. For example, paddle wheel agitators have been installed along the sides or along the ends of the filter tank, especially in connection with disc type filters. The action thereof is, however, local in character, and lacks the ability to carry heavy and fast-settling particles to the top of the body of pulp in the filter tank and to force the fines, slimes, and froth to the bottom. Their action is more to agitate and keep in suspension particles at the bottom of the tank, than to establish a thorough mixing of the pulp throughout the tank. Furthermore, it is necessary to employ drive shafts which pass through the side walls of the tank, and to seal these with packing glands. Such glands cause continual trouble, and are expensive to maintain. Again, should the power fail or the filter otherwise be shut down prior to completion of the filtering operation, the solids settle in the tank and firmly embed the paddle wheels against rotation. The tank often has to be flushed out before again starting up the filter.

With drum filters, oscillating agitators are often used. But their action is also localized in character, agitating only the pulp at the bottom of the tank, to keep the heavy particles therein from settling. They lack the ability to carry heavy particles to the top, and to force the fines, slimes, and froth to the bottom, and are by no means thorough in their general mixing action. They too have operating difficulties. Upon any inadvertent shut down, or upon the pulp getting too dense in the bottom of the tank, the agitator sticks, and the tank has to then be flushed out. Also, the solids frequently build up during operation, immobilizing the agitator and tearing the filter medium.

Another arrangement frequently tried, but seldom used for production purposes, is a series of air jets in the bottom of the filter tank. These are simpler and more effective than paddle wheel agitators, since they tend to keep the whole tank agitated. However, they do not do a complete job of mixing. They not only fail to carry the fines, slimes, and froth to the bottom, but they promote the formation of froth, which is highly undesirable. They are expensive to operate and to maintain. They are difficult to keep regulated, and they require constant attention. Their action is hard on filter elements, and promotes excessive wear on the filter tank proper. Unless they are carefully adjusted, they tend to scour the filter elements and hinder the building of filter cakes.

A circulating pump is sometimes used. The pump in such an arrangement discharges upwardly through a series of pipes in the bottom of the tank, and the tank overflows into the pump suction conduit. This is more satisfactory in its action on the pulp body, but is an awkard arrangement structurally, is expensive to install and to maintain, and requires constant attention. Should the power fail, or should some other inadvertent occurrence shut down the machine, the same difficulty of an embedded impeller is encountered. In addition, the pipes become clogged, and the pump and connections must be disassembled and flushed out.

These efforts notwithstanding, the common practice of the industry is to build the filter tank shallow and as close to the filtering elements as is workable, thereby keeping the quantity of pulp in the tank small. The feed is then distributed by a series of pipes spaced evenly along and between the filtering elements. But despite these precautions, which add considerably to construction costs and limit working capacity, filter cakes are still unevenly formed, filter elements are still at least partly blinded, and filtering operations are still generally unsatisfactory and far from efficient.

Being faced with these difficulties in industrial operations for which I am responsible, and recognizing the long-standing need for improved equipment, I have worked to produce a new and superior filter apparatus. In this connection, I have hit upon a new mechanical combination, which has either been overlooked heretofore, or, if conceived, has been immediately rejected as unworkable.

A great advantage of such combination is its simplicity. There is no need to extensively alter existing installations to convert them to the invention, and the additional equipment utilized is standard in most respects. Yet the results produced in practice by this novel combination of standard equipment is remarkable.

I have found that an ordinary down-draft impeller, advantageously of ship propellor type, disposed in the filter tank well above the floor level thereof but preferably at a low level relative to the overall height of the filter elements, and arranged for horizontal rotation on a vertical axis, will establish such a positive circulation of the pulp within the tank as to prevent classification, without disturbing the filtering action or the building up of the desired cake on the filter elements.

Depending upon the size of the filter tank, one or more of such down-draft impellers effect circulation of the pulp downwardly from above the impeller to the bottom of the tank, thence outwardly against the sidewalls of the tank, then upwardly towards the surface of the pulp, and finally back to the downdraft above the impeller, and causes the circulating pulp to carry particles of all different sizes and specific gravities, in well distributed intermixture, to all parts of the tank. Undesirable classification of particles is prevented, and substantially the complete area of every filter element is contacted by pulp having practically identical characteristics.

Optimum impeller pitch and speed of rotation will depend largely upon the type of pulp being treated, but may vary, also, in accordance with the particular size and type of filter. Generally speaking, it will be found desirable to locate the impeller such distance above the bottom of the tank as approximately equals the diameter of the impeller.

Because of the action of the impeller, it is possible to simplify filter tank construction, avoiding the complicated shapes and suspended support thereof required by the common practice of conforming the tank to the configuration of the filter element. This feature is especially significant with respect to the popular and widely used disc type filters. In accordance with this invention, a tank of simple formation, which rests flat on the floor, may be used. There is no need for exact fits or close clearances, and the tank is unencumbered by pipe connections for air or by packing glands. There are no special requirements in the positioning of pulp inflow or outflow, and the feed does not have to be carefully distributed at certain points, as is common in conventional filters.

Furthermore, should the power go off or the filter be otherwise inadvertently shut down, there is, in the instance of the invention, no danger of the filter elements or impellers becoming embedded, for, when the solids settle, there is ample space in the tank below the filtering elements and impeller to receive them. Consequently, the filter can always be immediately started up after a shut-down. Draining and flushing of the tank is completely eliminated. Upon starting up, the impeller almost instantly picks up all solids from the bottom of the tank, mixes them, and circulates them as before.

Thus, a principal object of the invention is to provide filter apparatus for industrial pulps or slurries, which apparatus:

Need not, for efficient operation, have its tank closely conforming in configuration to the configuration of the filter element;

Will eliminate the common tendency for "blinding" of the filter elements;

Will not become sanded when shut down for any purpose during any given operative run thereof;

Will accomplish unusually effective filtering results;

Will automatically re-suspend sands that may have bedded on the bottom of the tank during any shut-down;

Will promote the building of a porous filter cake uniformly over substantially the entire filtering surface;

Will permit a wide variation in feed of an industrial pulp or slurry to the filter tank, including localized feed at any point in the tank;

Will permit a wide variation in the location of overflow from the filter tank;

Will permit the addition of either a wet or dry filter-aid material of any desired specific gravity at substantially any point in the filter tank;

Will insure a final filter cake of maximum dryness;

Will effect considerable economies in operation;

Can be constructed at a considerable saving in cost over conventional agitated pulp filters.

Additional objects and features of the invention will become apparent from the following detailed description of the particular preferred forms of apparatus illustrated in the accompanying drawings as typical of those various forms which may be constructed on the basis of the teachings herein.

Figure 2:
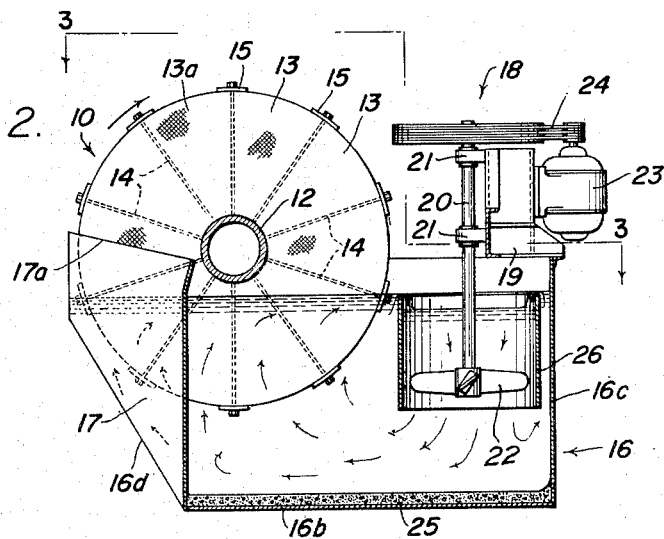
Figure 3:
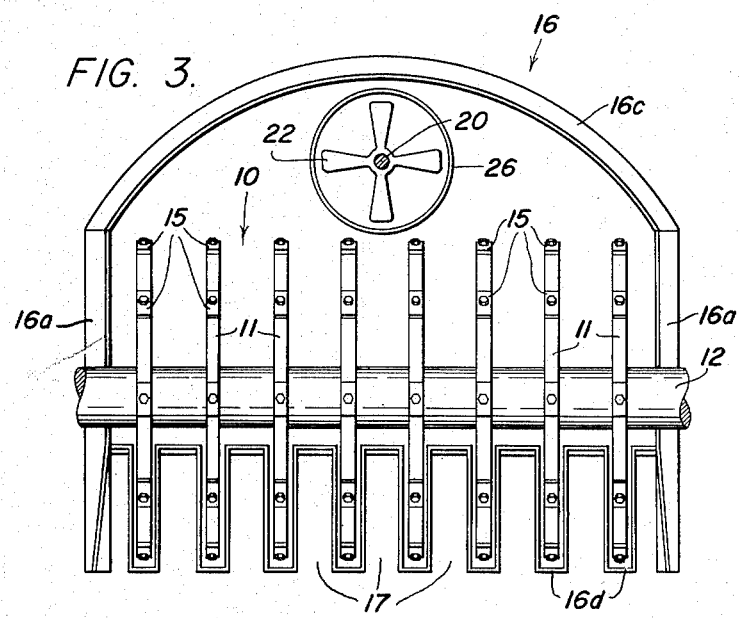
Figure 4:
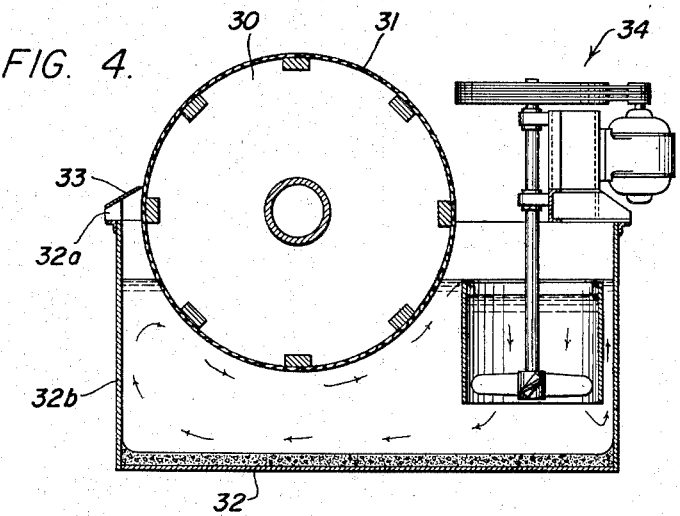

In the drawings:

Fig. 1 respresents a side elevation, partly in longitudinal vertical section, of pertinent portions of a rotating, disc type, vacuum filter embodying my invention;

Fig. 2, a transverse vertical section taken along the line 2—2 of Fig. 1;

Fig. 3, a top plan view partly in horizontal section taken on the line 3—3 of Fig. 2; and Fig. 4, a view corresponding to that of Fig. 3, but representing the invention applied to a standard type of drum filter.

Referring to the drawings:

In the embodiment illustrated in Figs. 1, 2 and 3, which represents a disc type filter as customarily employed in industrial filtering operations, the filtering assembly 10 is of standard construction, comprising a longitudinal series of mutually spaced filter discs 11, secured in mutually spaced relationship on a hollow, rotatable shaft 12.

Each of the filter discs 11 is made up, in customary fashion, of a plurality of radial filter segments 13, which are removably secured in place with respect to the shaft 12 by means of radial tie rods 14 and clamps 15.

The hollow shaft 12 is compartmented and the individual filter segments 13 are connected in flow communication therewith, in conventional manner, to produce alternate periods of suction and pressure air discharge through the filter cloth 13a of each filter segment 13 in accordance with standard operating practice. Furthermore, for this purpose, the hollow shaft 12 is rotatably mounted between stationary suction and air supply heads (not shown) and upon opposite end walls 16a, respectively, of a filter tank 16.

As has been stated hereinbefore, the filter tank of conventional disc type filters is commonly configurated to closely conform to the contour of the filter discs, which dip into the tank as they rotate. Thus, conventional filter tanks for this type of filter are usually provided with complicated trough formations, which make necessary special attention and expense in the construction of the tank, and the use of complicated suspension structure for supporting the tank.

In accordance with this invention, the need for such complicated and expensive tank construction and suspension is avoided. The filter tank is preferably made up in relatively simple fashion, without separation or compartmentation for the individual filter discs, except at the discharge lip provided for filter cake removal.

As illustrated, the filter tank 16 is made up simply of the end walls 16a, which are preferably rectangular in configuration, a flat bottom wall 16b, back wall 16c, and a front wall 16d which, in this instance, is deeply corrugated to provide for filter cake discharge, the filter cake falling to discharge through the deep indentations 17.

In accordance with the invention, there is a down-draft impeller assembly 18 combined with the filter tank 16 and the filtering assembly 10.

As illustrated, such impeller assembly 18 is suspended over the open top of the filter tank 16 from a bracket support 19 secured to and projecting from the back wall 16c of the tank, at preferably the mid-point thereof, and comprises a vertical impeller shaft 20 depending into the tank from a secure but rotatable mounting in spaced bearings 21. Secured to the lower end of such shaft 20 is a down-draft impeller 22, which is, as shown, advantageously of ship propellor type, for the purpose of exerting a strong displacement action on the pulp or slurry within the tank when the shaft 20 is rotated, as by means of an electric motor 23 acting through preferably a multiple V-belt drive 24. For most purposes, the speed of rotation will be approximately 100 R. P. M. for an impeller 30 inches in diameter.

The impeller 22, disposed above the bottom of the tank, develops a down-draft action.

For the purpose of enhancing its down-draft action, and, to a certain extent, for guiding the flow of pulp or slurry within the filter tank, an open-ended tubular housing 26 is advantageously, though not necessarily, positioned about the impeller, forming, in effect, a down-draft conduit within the tank.

In operation, the filtering assembly 10 is rotated in customary fashion from any suitable source of power and by any suitable drive arrangement (not shown). Suction is applied to the filter segments 13 in conventional manner during their passage through the pulp or slurry within the tank, and to a point immediately in advance of the upper surface of the front wall 16d, it being understood that the filtering assembly 10 rotates counter-clockwise, as shown by the appended arrow in Fig. 2. Air under pressure is utilized, also in conventional manner, to expand the filter cloth immediately above the discharge lips 17a, so that the cake will fall to discharge through the indentations 17.

But the action of such filtering assembly and the results achieved are considerably altered over the conventional, by reason of the concurrent action of the impeller assembly 18. The down-draft effect of impeller 22 on the body of pulp contained within the filter tank 16, see the arrows in Fig. 2, constantly presents a well integrated mixture of pulp to the filter cloth surfaces of the filter discs 11, without unduly scrubbing such surfaces. The down-draft current of pulp, established and maintained within the body of pulp by impeller 22, impinges against the bottom wear surface 25 of the tank, where it fans out in all directions to prevent the collection of heavier sands which may tend to precipitate from the pulp, or to resuspend precipitated solids following any shut-down. In so doing, the force of the pulp stream is largely dissipated, so that it produces a comparatively gentle upward flow about the filtering surfaces of the filter discs 11.

There is no opportunity for the collection of a froth at the surface of the body of pulp, since such surface is constantly sucked down into the line of action of the impeller. Furthermore, the feed pulp may be introduced at any point or points in the filter tank without disturbing the operation of the apparatus, and the pulp may be of any consistency within a wide range of sizes and specific gravities of the component particles. Distribution of the pulp to the filter surfaces is substantially uniform and even, regardless. This means that practically all of the special precautions taken in conventional filter practice are unnecessary with the apparatus of the invention. Almost perfect filtering conditions result, with build-up of filter cake having very nearly ideal characteristics.

The invention is not restricted to disc-type filters, but may be applied to other types of rotary vacuum filters, for example, a drum filter, such as is illustrated in Fig. 4.

In Fig. 4, the filtering surfaces are disposed circumferentially of a rotary filter structure 30 of cylindrical formation. Thus, the filter cake builds up on the cylindrically disposed filter cloth 31, and is scraped off at the discharge lip 32a of the filter tank 32, as by means of an elongate rectilinear blade 33.

The tank 32 may be fabricated in essentially the same manner as the tank 16 of the previously described embodiment, with the exception that the front wall 32b thereof is straight, rather than indented.

The down-draft impeller assembly 34 is of essentially the same construction and is mounted similarly to that of the previously described embodiment. Its action is the same as that of the down-draft impeller assembly 18, and the results achieved are essentially similar.

It should be noted that here, as in the case of the impeller 22, the fanning out of the down-draft current against the bottom of the filter tank 32 protects the filtering surfaces 31 from any undue scrubbing action, while maintaining a very effective suspension of the solids of the pulp or slurry being filtered and a substantially even distribution of pulp to the filter surfaces.

While only one down-draft impeller assembly is utilized in the embodiments illustrated, it is easily seen that the size of the filter may require the placement of more than one such assembly along the width of the filter tank, that is to say, in mutually spaced and side by side relationship along the length of the filter structure 30, or of the filter structure 10.

I claim:

1. In that type of vacuum filter for pulps or slurries wherein filter cake is built up on porous filter surfaces during the operation thereof as an aid to said operation, the combination of a filter tank having peripheral walls spaced apart from one another to define an interior which is largely undivided and adapted to hold, in essentially pool formation, a body of pulp or slurry to be filtered; a vacuum filtering assembly rotatably mounted between said walls of the filter tank and having porous filter surfaces of cake-accumulating character positioned to dip deeply into the said undivided portion of the interior of the tank as said filtering assembly rotates; a pulp or slurry circulating impeller rotatably mounted on a substantially vertical axis and in downdraft position within the interior of said tank, well below the top of the tank but in upwardly spaced relation to the bottom thereof and in laterally spaced relation to the said filtering assembly; and impeller supporting and drive means.

2. The combination recited in claim 1, wherein the impeller supporting and drive means extends down into the filter tank from the top of said filter tank, and terminates short of the bottom of said filter tank.

3. The combination recited in claim 1, wherein the impeller is of ship propellor type.

4. The combination recited in claim 1, wherein a substantially vertically disposed, tubular housing surrounds the said impeller, said housing being open at opposite ends.

5. The combination recited in claim 1, wherein the impeller supporting and drive means comprises a substantially vertical shaft, to the lower end of which the impeller is secured; a bracket structure extending inwardly of the tank from the top of one of the walls thereof, said shaft being rotatably mounted by said bracket structure; and means for rotating said impeller mounted on said bracket structure.

References Cited in the file of this patent

UNITED STATES PATENTS

| | | |
|---|---|---|
| 1,219,290 | Goyne et al. | Mar. 13, 1917 |
| 1,641,736 | Christensen | Sept. 6, 1927 |
| 1,957,303 | Tietig | May 1, 1934 |